Dec. 11, 1962 R. A. LUBBEN ETAL 3,067,504
METHOD OF MAKING A FILTER SOCK
Filed June 12, 1959 2 Sheets-Sheet 1
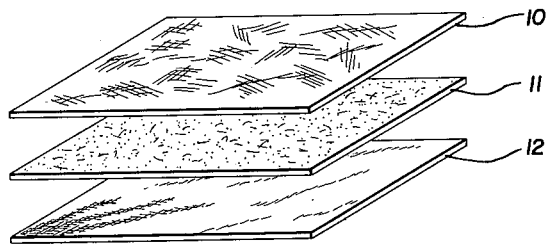
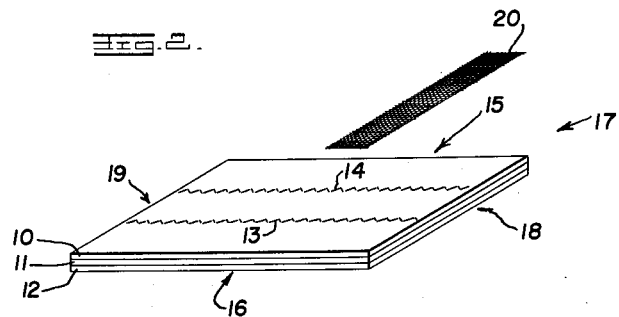
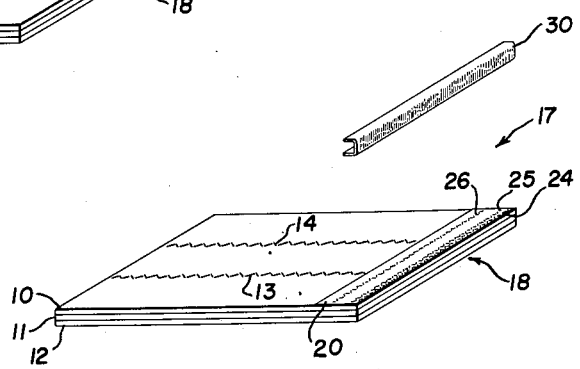
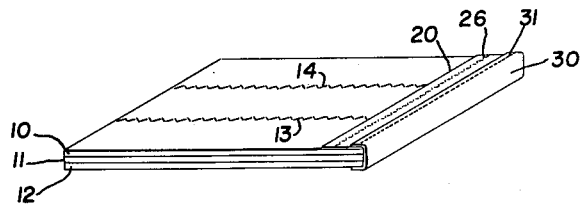
INVENTORS
Robert A. Lubben
Paul A. Smith
BY
ATTORNEY Dec. 11, 1962   R. A. LUBBEN ETAL   3,067,504
METHOD OF MAKING A FILTER SOCK
Filed June 12, 1959   2 Sheets-Sheet 2
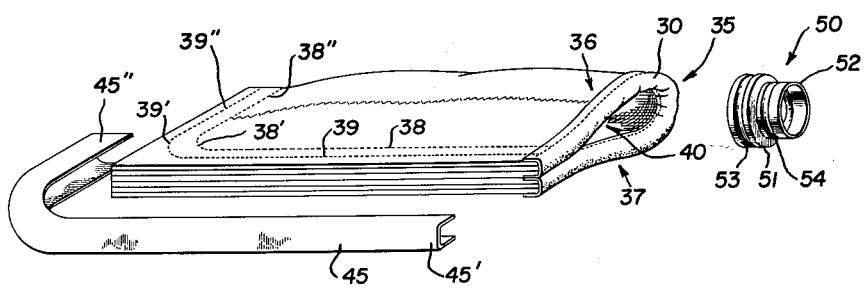
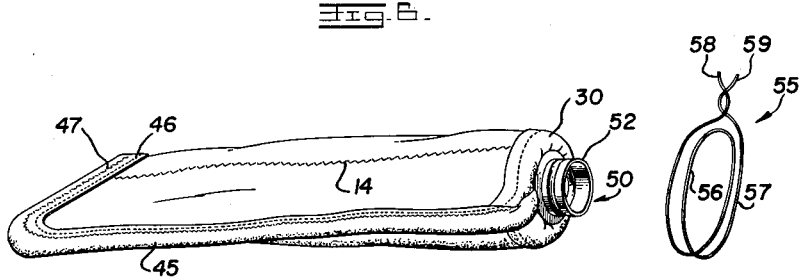
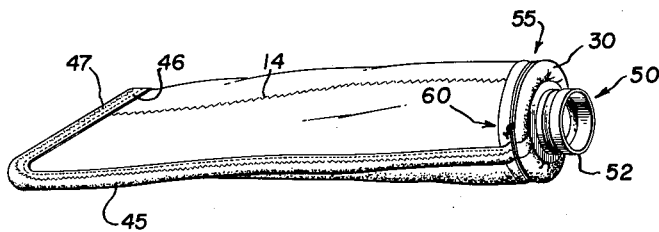
INVENTORS
Robert A. Lubben
BY Paul A. Smith
ATTORNEY

United States Patent Office 3,067,504
Patented Dec. 11, 1962

3,067,504
METHOD OF MAKING A FILTER SOCK
Robert A. Lubben, Hollywood, and Paul A. Smith, Tarzana, Calif., assignors to Permanent Filter Corporation, Los Angeles, Calif., a corporation of California
Filed June 12, 1959, Ser. No. 819,892
4 Claims. (Cl. 29—419)

The present invention relates to a new and novel method of manufacturing filter socks, and more particularly the method of manufacturing filter socks formed of a plurality of superimposed layers of material.

The present invention relates to a method of making filter socks of the type wherein the sock is of closed configuration and is provided with an open end portion, the fluid to be filtered normally passing inwardly through the open end portion of the sock and thence outwardly through the walls of the sock to pass downstream thereof.

The sock according to the present invention is particularly adapted for use in the filtration of hydrocarbon fuels such as used for example in jet aircraft and missiles wherein it is necessary to remove a maximum amount of water from the filtered fluid. Accordingly, the method according to the present invention is especially adapted for the manufacture of a filter sock which has excellent water stripping characteristics.

In order to provide the desired water stripping function, the present method contemplates the utilization of a plurality of layers of material which may each be of different characteristics so as to provide the desired end result. Accordingly, the sock includes an inner layer of relatively coarse fiberglass, an intermediate layer of relatively fine fiberglass and an outer layer of nylon cloth. These various layers are suitably secured to one another and a reinforcing means is provided adjacent one edge thereof. A strip of fabric is then folded around this last-mentioned edge and secured in position. This assembly is then folded so as to be doubled upon itself.

After folding the assembly over, the two halves of the assembly are suitably secured together and then trimmed to the desired finished shape. An elongated strip of fabric is then folded around the trimmed edges and secured in position. At this point, a sock is provided which is closed except for an opening provided at one end portion thereof. It is an additional important feature of the invention to provide a means whereby the finished sock can be readily mounted and dismounted from a supporting header plate or the like.

Filter socks of the type according to the present invention are ordinarily employed in relatively large numbers within suitable filtration equipment, the socks being mounted upon a header plate or the like. During operation of the equipment, solid contaminants are removed from the filtered fluid and eventually the individual socks become blinded to the point where they either operate inefficiently or become completely inoperative. In this case, the socks must be removed and cleaned or replaced. It accordingly becomes highly important to provide a filter sock which can be quickly and easily mounted or dismounted from its supporting structure. In order to provide a means for readily mounting and dismounting the filter socks according to the present invention, an attaching fitting is provided in the open end of the sock, this attaching fitting being especially adapted to be slipped over a boss provided on a header plate and snapped into operative position.

The attaching fitting includes a substantially cylindrical portion which is inserted within the open end of the sock, the cylindrical portion of the fitting being provided with a circumferentially extending groove. After this cylindrical portion is inserted in the open end of the sock, a flexible wire is wrapped around the outer surface of the sock, and tension is applied to the wire so as to draw the material of the sock into the circumferential groove in the fitting. The ends of the wire are then suitably secured to one another so as to maintain the wire under tension and to thereby lock the material of the sock to the attaching fitting. In this manner a finished sock is provided which is of a closed construction having an open end portion within which an attaching fitting is rigidly fixed, the sock thereby being capable of being quickly and easily mounted and dismounted from a suitable supporting structure.

An object of the present invention is to provide a new and novel method for manufacturing a filter sock incorporating a plurality of layers of superimposed material which are especially adapted to separate not only solid contaminants, but also water from filtered fluid.

Another object of the invention is the provision of a new and novel method of manufacturing a closed filter sock having an open end portion within which an attaching fitting is fixed to enable ready mounting and dismounting of the filter sock on a supporting structure.

A still further object of the invention is to provide a method of manufacturing a filter sock which is quite simple and inexpensive, and yet which may be readily performed with a minimum of skill.

Other objects and many attendant advantages of the invention will become more apparent when considered in connection with the specification and accompanying drawings, wherein:

FIG. 1 schematically indicates a plurality of layers which are superimposed upon one another to provide the initial stacked assembly;

FIG. 2 illustrates a subsequent step wherein the layers have been secured to one another and reinforcing means is about to be mounted in position.

FIG. 3 illustrates a subsequent step wherein an elongated strip of fabric is about to be mounted about one edge of the assembly;

FIG. 4 illustrates the assembly after the last-mentioned elongated strip has been mounted in operative position;

FIG. 5 illustrates the assembly after it has been folded over with the two halves secured together and with a second elongated strip and an attaching fitting ready for mounting thereon;

FIG. 6 illustrates the assembly of FIG. 5 with the last-mentioned elongated strip secured in operative position and with the attaching fitting inserted in the open end of the sock; and FIG. 7 illustrates the finished filter sock.

Referring now to the drawings, wherein like reference characters designate corresponding parts throughout the several views, there is shown in FIG. 1, three layers of material indicated by reference numerals 10, 11, and 12, these layers being of any suitable configuration to provide the desired finished size of the sock, each of the layers being of substantially the same size as shown. It is, of course, understood that prior to assembling the various layers, they are first cut and visually inspected to assure that there are no faults in the material. Layer 10 represents the layer which eventually comprises the inner layer of the finished sock and is formed preferably of a relatively coarse fiberglass material such as the material which is sold under the name of "Format" manufactured by Thalco, of Los Angeles, California. The intermediate layer 11 is preferably formed of a relatively fine fiberglass material such as the material identified as "TWF" manufactured by the Owens-Corning Co., of Los Angeles, California. The third or outer layer 12 of the filter sock is preferably formed of nylon fabric such as the material identified as "N.S.-1228" manufactured by National Filter Media Co., of Salt Lake City, Utah.

The three layers of material are superimposed upon one another with the faces thereof in abutting relationship, and the three layers are then secured to one another by sewing along two lines indicated by reference numerals 13 and 14 in FIG. 2, the sewing being preferably in two parallel loose zig-zag stitches, these stitches being spaced from the side edges 15 and 16 of the overall assembly indicated generally by reference numeral 17. One end of the stitches is spaced from the top edge 18 and the opposite ends of the stitches extend to a point closely adjacent the bottom edge 19 of the assembly. In the particular method illustrated, the side edges are longer than the top and bottom edges such that the layers of material are stitched together along longitudinally extending lines.

As seen in FIG. 2, a relatively narrow strip of insect screen which may be formed of plastic or the like is provided with a length substantially equal to that of the top edge 18 of the assembly 17, member 20 serving as a reinforcing means. Reinforcing means 20 is then juxtaposed with the upper surface of layer 10 of the assembly 17 as seen in FIG. 3 and then is secured in operative position by means of sewing along two lines indicated by numerals 24 and 25 which are positioned closely adjacent the top edge 18 of the assembly and by sewing along a third line 26 which is spaced from the upper edge 18. The sewing along each of lines 24—26 is preferably in the form of zig-zag stitches as indicated.

An elongated strip of material 30 as seen in FIG. 3 is provided, this strip of material having a length substantially equal to that of the upper edge 18 of the assembly, strip 30 being formed of a suitable fabric such as nylon ribbon. The strip 30 is then folded around the upper edge 18 of the assembly as indicated in FIG. 4 and is secured in position by sewing along line 31 which is positioned closely adjacent the upper edge of the assembly, the sewing preferably being in the form of a straight stitch.

Referring now to FIG. 5, the assembly as shown in FIG. 4 has been folded over upon itself to define a fold seam indicated generally by reference numeral 35 which separates the assembly into two halves indicated generally by reference numerals 36 and 37. The two halves of the assembly are then secured together by sewing along two lines 38 and 39 by means of a straight stitch, lines 38 and 39 extending substantially parallel to the side edges of the assembly throughout a major portion of the length of the assembly and then along radii indicated at 38′ and 39′ and thence along lines 38″ and 39″ to a point where they intersect the fold seam 35. The straight stitches along 38 and 39 thereby define a closed sock having an open end portion at 40. It is apparent that the stitching along line 38 serves primarily to close the sock, and the stitching along line 39 serves primarily to simplify the subsequent trimming operation.

After the two halves of the assembly are stitched together along lines 38 and 39, the excess material outwardly of line 39 is cut away by means of shears or the like so as to provide cut outer edges which are substantially parallel to line 39 and spaced a short distance therefrom. As seen in FIG. 5, an elongated strip of material 45 is provided which is adapted to fit about the cut edges of the sock subsequent to the trimming operation. Strip 45 is preferably formed of nylon ribbon or the like similar to strip 30 and is provided with a length which is slightly greater than that of the cut edges of the sock extending from the upper edge of the sock to the fold seam thereof. The excess length of strip 45 permits the upper end 45′ of the strip to be folded down inside the sock to a point where it may overlie the upper edge of the insect screen inside the sock, and the excess material at the lower end 45″ of the strip permits the lower end to be folded back under itself to reinforce the lower end thereof. The strip 45 is folded around the cut edges of the sock and then secured in position by sewing along lines 46 and 47 as seen in FIG. 6, the sewing along line 46 being a straight stitch and the sewing along line 47 being a zig-zag stitch. In this manner, the sock is provided with a very secure closure opposite the fold seam thereof which insures that fluid can not leak therethrough and that the sock will not burst when subjected to operating pressures.

Referring again to FIG. 5, an attaching fitting is indicated generally by reference numeral 50, the attaching fitting including a first enlarged cylindrical portion 51 and a second integral reduced cylindrical portion 52, portion 51 being provided with a circumferentially extending groove 53 and portion 52 being provided with a circumferentially extending groove 54. Cylindrical portion 52 is adapted to be fitted about a cooperating boss on a supporting structure such as a header plate and groove 54 is employed for securing the attaching fitting in operative position on its supporting boss. Attaching fitting 50 is preferably formed of a suitable rigid material such as brass or the like.

The attaching fitting 50 is inserted in the open end of the sock as shown in FIG. 6, such that the cylindrical portion 51 thereof is disposed within the material of the sock and the cylindrical portion 52 extends outwardly therefrom. As seen in FIG. 6, a flexible metallic wire indicated generally by reference numeral 55 is provided, the wire being of a material which is not adversely affected by the fluid being filtered through the sock.

As seen in FIG. 6, the wire is folded so as to provide first and second loops 56 and 57, each of which is adapted to extend around the outer surface of the sock adjacent its open end, the wire being placed around the sock and overlying the groove 53 in the attaching fitting, whereupon tension is applied to the wire to draw the material of the sock inwardly into the groove 53. The opposite ends 58 and 59 of the wire are then entwined with one another to lock the wire in position as indicated at 60 in FIG. 7, thereby securing the wire in operative position and locking the sock to the attaching fitting 50. This final locking of the attaching fitting to the sock provides the finished sock according to the present invention.

It is apparent from the foregoing that there is provided a new and novel method of manufacturing filter socks which are adapted not only to remove solid contaminants, but also are especially adapted to separate water from the filtered fluid, the combination of the layers of coarse and fine fiberglass with an outer layer of nylon being particularly effective in this respect. The method provides a closed sock having an open end portion within which an attaching fitting is secured such that the sock may be quickly and easily mounted and dismounted on suitable supporting structures.

The method according to the present invention is quite simple and inexpensive, and provides a rapid manner of manufacturing filter socks which requires a minimum amount of skill in the performance thereof.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. The method of manufacturing a filter sock comprising forming an assembly including three separate layers of material, at least one of said layers comprising nylon and at least one other of said layers comprising fiber glass, said layers being in abutting relationship with one another, sewing the layers to one another to define top and bottom edges and side edges, sewing a reinforcing screen along the top edge of the assembly, folding a first elongated strip of nylon over said top edge of the assembly and sewing the first strip in operative position, then folding the entire assembly substantially in half thereby forming a fold seam, sewing portions of the assembly to one another along a line extending substantially parallel to the fold seam adjacent the edges of the assembly, the line curving inwardly adjacent the bottom edge of the assembly and intersecting the fold seam to thereby form a closed sock having a single open end portion, cutting off portions of the assembly adjacent said last-mentioned line, then folding a second elongated strip of nylon around the cut edges and sewing said second strip in operative position, then inserting an attaching fitting in the open end of the sock, and securing the attaching fitting in fixed relationship to the end of the sock.

2. The method as defined in claim 1, wherein the attaching fitting is provided with a peripheral groove which is located within the sock, the step of securing the fitting in place comprising wrapping a flexible wire around the outer surface of the sock and placing tension in the wire to draw the sock into the groove formed in the fitting to thereby lock the fitting and the sock to one another, and securing the ends of the wire together to maintain the wire under tension.

3. The method of manufacturing a filter sock comprising forming an assembly including a plurality of separate layers of material, sewing the layers together to define top and bottom edges and side edges of the assembly, placing a reinforcing means along the top edge of the assembly and sewing the reinforcing means in place, folding an elongated strip of fabric around said top edge of the assembly and securing said strip in place, doubling the assembly upon itself along a line extending substantially parallel to the side edges of the assembly thereby forming a fold seam defining two halves, sewing the two halves together adjacent the side edges thereof along a line which extends substantially parallel to the fold seam for a major portion of the fold seam and which curves inwardly adjacent the bottom edge of the assembly to intersect the fold seam thereby forming a closed sock having a single open end adjacent the upper edge thereof, trimming the assembly adjacent the line along which the two halves are sewn together and then folding an elongated strip of fabric around the trimmed edges, sewing said last-mentioned strip in position, inserting an attaching fitting in said open end, and securing said fitting in operative position.

4. The method of manufacturing a filter sock comprising forming an assembly including a plurality of separate layers of material, sewing the layers together to define top and bottom edges and side edges of the assembly, placing a reinforcing means along the top edge of the assembly and sewing the reinforcing means in place, folding an elongated strip of fabric around said top edge of the assembly and securing said strip in place, doubling the assembly upon itself along a line extending substantially parallel to the side edges of the assembly thereby forming a fold seam defining two halves, sewing the two halves together adjacent the side edges thereof along a line which extends substantially parallel to the fold seam for a major portion of the fold seam and which curves inwardly adjacent the bottom edge of the assembly to intersect the fold seam thereby forming a closed sock having a single open end adjacent the upper edge thereof, inserting an attaching fitting in said open end, securing said fitting in operative position by winding a wire around the outer surface of the sock to urge the inner surface of the sock adjacent the open end thereof into firm contact with the outer surface of the attaching fitting, and securing the wire in position.

References Cited in the file of this patent

UNITED STATES PATENTS

| | | |
|---|---|---|
| 621,937 | Niamann | Mar. 28, 1899 |
| 1,706,160 | Hinman | Mar. 19, 1929 |
| 2,076,104 | Vinton | Apr. 6, 1937 |
| 2,300,382 | Hardy | Oct. 27, 1942 |
| 2,314,640 | Winslow | Mar. 23, 1943 |
| 2,367,745 | Wicks | Jan. 23, 1945 |
| 2,607,876 | Bergen | Aug. 19, 1952 |
| 2,746,138 | Smith | May 22, 1956 |
| 2,762,667 | Harkenrider | Sept. 11, 1956 |
| 2,857,610 | Rympalski | Oct. 28, 1958 |